United States Patent
Chengson et al.

(10) Patent No.: US 8,164,392 B2
(45) Date of Patent: Apr. 24, 2012

(54) ERROR-FREE STARTUP OF LOW PHASE NOISE OSCILLATORS

(75) Inventors: David P. Chengson, Aptos, CA (US); Victor Do, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 66 days.

(21) Appl. No.: 12/767,194

(22) Filed: Apr. 26, 2010

(65) Prior Publication Data
US 2011/0260769 A1  Oct. 27, 2011

(51) Int. Cl.
*H03B 1/00* (2006.01)
*H03K 17/28* (2006.01)

(52) U.S. Cl. .............. 331/74; 327/291; 327/392

(58) Field of Classification Search ............. 331/74, 331/172, 173, 182, 116 R, 116 FE, 158; 327/291, 327/299, 392, 394, 398, 399
See application file for complete search history.

(56) References Cited

U.S. PATENT DOCUMENTS

| | | | |
|---|---|---|---|
| 6,480,071 B1* | 11/2002 | Fujii et al. | 331/74 |
| 7,123,113 B1* | 10/2006 | Brennan et al. | 331/158 |
| 7,429,900 B2* | 9/2008 | Nunokawa et al. | 331/158 |
| 7,573,342 B2* | 8/2009 | Grewing et al. | 331/74 |
| 2003/0128076 A1* | 7/2003 | Ogawa et al. | 331/74 |
| 2005/0275480 A1* | 12/2005 | Nishio | 331/158 |
| 2007/0075793 A1* | 4/2007 | Maxim et al. | 331/74 |
| 2008/0290736 A1* | 11/2008 | Onishi et al. | 307/107 |

\* cited by examiner

*Primary Examiner* — Ryan Johnson
(74) *Attorney, Agent, or Firm* — Harrity & Harrity, LLP

(57) ABSTRACT

An isolation switch is used to isolate the output of an oscillator, during startup of the oscillator, from the circuitry that uses the periodic signal generated by the oscillator. In one implementation, a device may include an oscillator to generate a periodic signal and a switch connected to receive an output of the oscillator. The switch may include a control input that controls whether the switch is in an open or closed state. Switch control circuit may control the switch so that the switch is in an open state during startup of the oscillator and the switch is in a closed state thereafter.

22 Claims, 5 Drawing Sheets

ERROR-FREE STARTUP OF LOW PHASE NOISE OSCILLATORS

BACKGROUND

Electronic equipment, such as telecommunication devices, frequently include oscillators. An oscillator is an electronic circuit designed to produce a repetitive signal. Oscillators can be used to generate clock signals which are then supplied to other circuits.

Some electronic devices are designed to function at very high frequencies. In a high capacity network router, for example, high clock operating frequencies, such as frequencies on the order of ten gigahertz or higher, may be used. High frequency oscillators, such as high frequency, low phase noise oscillators, may be used to obtain the high clock frequencies.

Low phase noise oscillators include a known class of oscillators capable of high frequency operation. Low phase noise oscillators may be sensitive to start-up noise. When initially powered-up or enabled, a low phase noise oscillator may go through an initialization phase until the oscillator stabilizes at the desired oscillation frequency. During the initialization phase, low phase noise oscillators can be sensitive to noise that can cause the oscillator to not stabilize or stabilize at the wrong frequency.

It is desirable that when powering-up or restarting electronic equipment that uses oscillators, that the oscillators stabilize at the desired oscillation frequency.

SUMMARY

In one implementation, a device may include an oscillator that generates a periodic signal. A switch may be connected to receive an output of the oscillator and controlled to be in an open or closed state. A switch control circuit may control the switch so that the switch is in an open state during startup of the oscillator and the switch is in a closed state thereafter.

In another implementation, a device may include a clock distribution circuit; a number of functional components connected to receive one or more clock signals from the clock distribution circuit; and a clock circuit. The clock circuit may include an oscillator, a switch connected to pass or isolate an output of the oscillator to the clock distribution circuit, and a switch control circuit to control the switch so that the switch isolates the output of the oscillator from the clock distribution circuit during initial startup of the oscillator and passes the output of the oscillator to the clock distribution circuit thereafter.

In yet another implementation, a system may include a printed circuit board including a clock distribution circuit; a number of functional components connected to receive one or more clock signals from the clock distribution circuit; and a clock circuit. The clock circuit may include an oscillator and a switch. The switch may be connected to pass or isolate an output of the oscillator to the clock distribution circuit. The switch may be controlled so that the switch isolates the output of the oscillator from the clock distribution circuit during initial startup of the oscillator and passes the output of the oscillator to the clock distribution circuit thereafter. The system may further include a first power supply connected to the printed circuit board to supply power to the functional components; and a second power supply connected to the printed circuit board to supply power to the clock circuit.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

Techniques for reducing or eliminating startup problems for an oscillator, such as a low phase noise oscillator, are disclosed. In one implementation, an isolation switch may be placed between the oscillator and the circuitry that distributes and uses the output of the oscillator. The isolation switch may be controlled to isolate the oscillator during the initialization phase of the oscillator.

Figure 1:
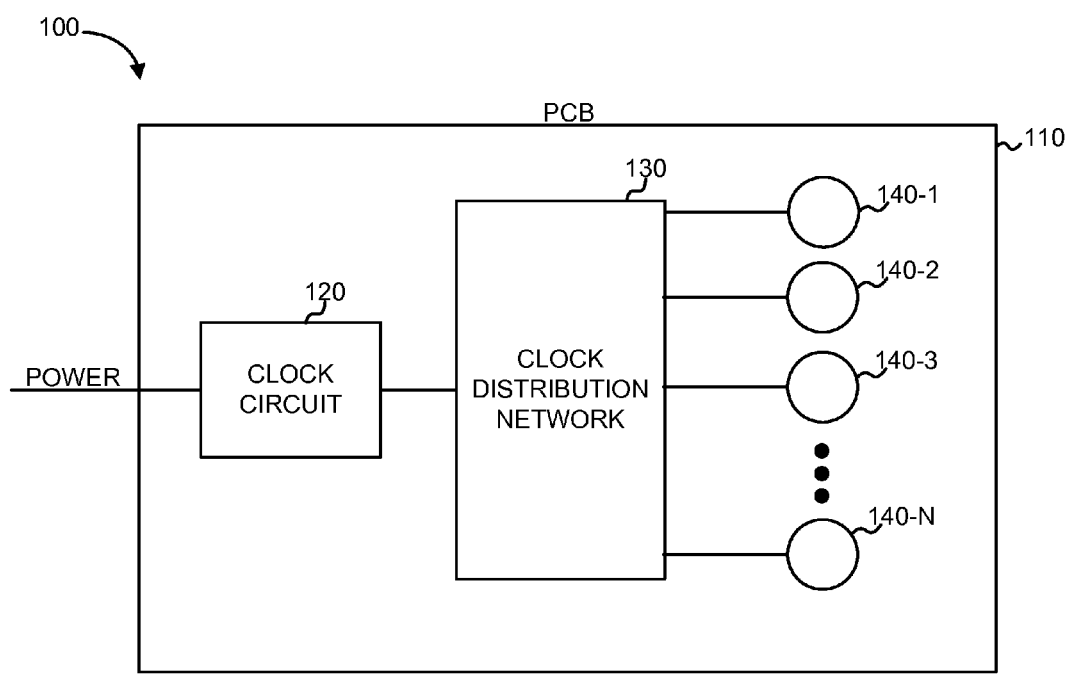
FIG. 1 is a diagram of an example system in which concepts described herein may be implemented.

FIG. 1 is a diagram of an example system 100 in which concepts described herein may be implemented. System 100 may include a printed circuit board (PCB) 110. PCB 110 may be used to mechanically support and electrically connect electronic components using conductive pathways. PCB 110 may be populated with a number of passive or active electronic components, such as resistors, capacitors, semiconductor chips, etc.

The techniques described herein will generally be described as being implemented by components on PCB 110. However, the techniques described herein could also be implemented in other environments, such as by different circuits in a single semiconductor chip or package.

PCB 110 may include a clock circuit 120, a clock distribution network 130, and functional components 140-1 through 140-N (collectively referred to herein as "functional components 140"). Clock circuit 120 may generate one or more clock signal(s) that are to be used by functional components 140. The generated clock signals may be high frequency clock signal(s), such as a clock signal on the order of a gigahertz (GHz) or more. The clock signal(s) may be generated using a high frequency oscillator, such as a hi-Q low phase noise oscillator. Clock circuit 120 may be powered by an externally supplied power signal (POWER). Clock circuit 120 may also receive an external enable signal (ENABLE), which may be used to control the on/off state of clock circuit 120.

Clock distribution network 130 may include a circuit to distribute the generated clock signal(s) to functional components 140. Clock distribution network 130 may include, for example, a series of conductive traces that connect clock circuit 120 to functional components 140. In some implementations, clock distribution network 130 may include other elements to deliver the generated clock signal(s) to functional components 140. In general, clock distribution network 130 may be designed to distribute the generated clock signals to functional components 140 in a manner that introduces as little distortion as possible into the clock signals.

Functional components 140 may each represent a logical component (e.g., an electronic circuit) that "consumes" the generated clock signal(s). Each functional component 140 may represent one or more electrical circuits, such as a processor, an application specific integrated circuit (ASIC), an analog filter, a digital signal processor (DSP), etc. In one implementation, functional components 140 of PCB 110 may be particularly arranged to operate as a network device that performs packet routing and forwarding.

FIG. 1 illustrates an example system. In other implementations, system 100 may include additional, fewer, different, or differently arranged components than those illustrated in FIG. 1 and described herein. Moreover, one or more components shown in FIG. 1 may perform one or more tasks described herein as being performed by another component.

Figure 2:
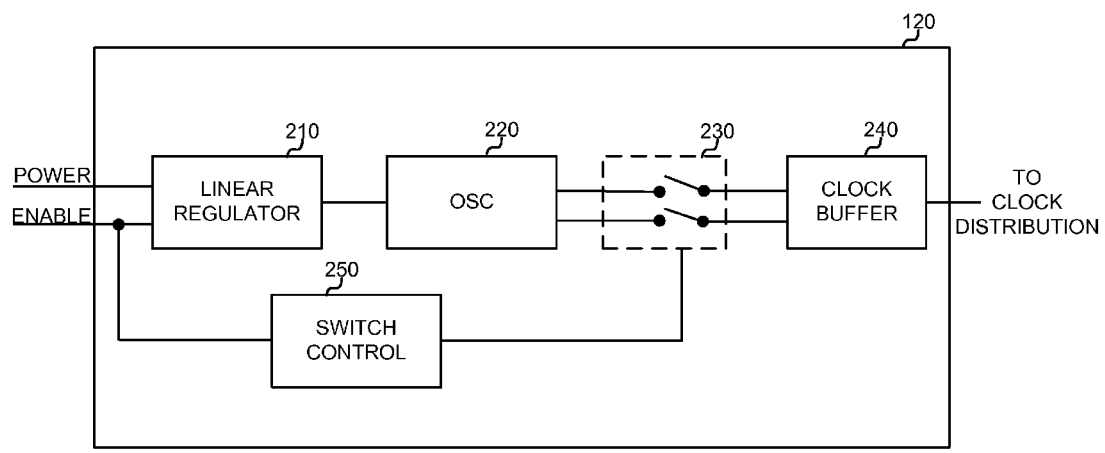
FIG. 2 is a diagram illustrating an example implementation of a clock circuit shown in FIG. 1.

FIG. 2 is a diagram illustrating an example implementation of clock circuit 120. Clock circuit 120 may include a linear regulator 210 that receives input power and provides power to an oscillator (OSC) 220. The output of oscillator 220 may be provided through a switch 230 and to a clock buffer 240. Switch 230 may be controlled by a switch control component 250.

Linear regulator 210 may include circuitry designed to regulate the input power supply to maintain a constant output power. In one implementation, linear regulator 210 may be a voltage regulator based on an active device (such as a bipolar junction transistor or a field effect transistor) or passive devices (e.g., zener diodes operated in their breakdown region) that act like a variable resistor to continuously adjust a voltage divider network to maintain a constant output voltage. Other types of regulators or other implementations of linear regulator 210 could alternatively be used. Linear regulators are generally known and, accordingly, additional details relating to linear regulator 210 will not be described herein.

Linear regulator 210 may also include an "enable" input. Depending on the logic level applied to the enable line, linear regulator 210 may either operate normally or, when disabled, may block output power to oscillator 220. The enable input may thus be used to control the on/off state of clock circuit 120.

Oscillator 220 may receive power from linear regulator 210. Oscillator 220 may include a semiconductor device to produce a periodic, such as a sinusoidal, output signal. Oscillator 220 may particularly include a high frequency oscillator, such as an oscillator designed to produce an output signal having a frequency of a GHz or higher. In one implementation, oscillator 220 may include a low phase noise oscillator. Oscillator 220 may output either a differential or single-ended output signal. As shown in FIG. 2, oscillator 220 produces a differential output signal (shown as two output lines from oscillator 220). Oscillators, such as low phase noise oscillators, are generally known and will thus not be described in detail herein.

Some oscillators, such as high frequency low phase noise oscillators, may be particularly sensitive to start-up noise. When initially powered-up or enabled, a low phase noise oscillator may go through an initialization phase until the oscillator stabilizes at the desired oscillation frequency. During the initialization phase, low phase noise oscillators can be sensitive to noise, such as high frequency noise, that can cause the oscillator to not stabilize or stabilize at the wrong frequency.

Switch 230 may include a switch to temporarily isolate the output of oscillator 220 from the downstream electrical components, such as clock buffer 240, clock distribution network 130, and functional components 140. Isolating oscillator 220 from these elements may decouple oscillator 220 from system noise during the startup of oscillator 220, potentially improving the chance for successful initialization of oscillator 220.

Switch 230 may be implemented using a number of different technologies. For example, switch 230 may use one or more field effect transistors (FETs), such as metal-oxide-semiconductor FETs (MOSFETs). Alternatively, switch 230 may include a mechanical switch, such as a mercury-based relay. The control input for switch 230 may connect to switch control component 250. In general, switch 230 may exhibit the following properties: when closed, switch 230 may have a well controlled impedance with small insertion loss and return loss; and, when open, switch 230 may have a high level of isolation (i.e., high frequency noise should not "jump" the switch barrier).

Clock buffer 240 may include circuitry to buffer and/or sample the periodic signal from oscillator 220. For example, clock buffer 240 may, for instance, act as a thresholding circuit that converts the sinusoid output by oscillator 220 into a periodic clock signal.

Switch control component 250 may control switch 230. Switch control component 250 may control switch 230 to open switch 230 during initialization of oscillator 220. Thereafter, switch control component 250 may close switch 230 to connect oscillator 220 to clock buffer 240.

Although FIG. 2 illustrates an example clock circuit, in other implementations, clock circuit 120 may include additional, fewer, different, or differently arranged components than those illustrated in FIG. 2 and described herein. Moreover, one or more components shown in FIG. 2 may perform one or more tasks described herein as being performed by another component.

Figure 3A:
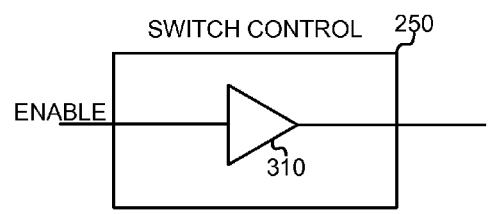
FIG. 3A is a diagram illustrating an example implementation of a switch control component shown in FIG. 2.
Figure 3B:
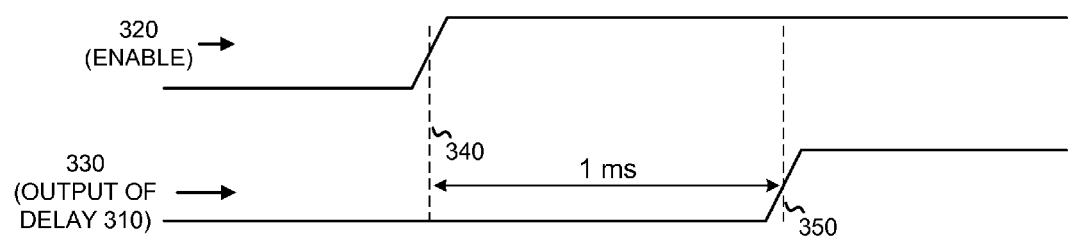
FIG. 3B is a timing diagram illustrating the operation of the switch control component.

FIG. 3A is a diagram illustrating an example implementation of switch control component 250. FIG. 3B is a timing diagram illustrating the operation of switch control component 250.

In one implementation, switch control component 250 may include a delay element, such as delay element 310. Delay element 310 may be implemented using, for example, inductor-capacitor delay lines or an active circuitry based delay element (e.g., an op-amp based delay circuit).

In the timing diagram of FIG. 3B, the enable signal input to switch control component 250 is labeled as signal 320. The output signal is labeled as signal 330. In this example, assume delay element 310 introduces, approximately, a one millisecond delay. In operation, at time 340, the enable signal may be input to linear regulator 210 and linear regulator 210 may begin to supply power to oscillator 220. Oscillator 220 may thus begin to startup. At this time, switch 230 is in the open position, isolating oscillator 220 from clock buffer 240, clock distribution network 130, and functional components 140. At time 350 the operation of oscillator 220 may be stable. The transition of signal 330, at time 350, may cause switch control component 250 to close, connecting oscillator 220 to clock distribution network 130.

Although a one millisecond delay is shown in the example of FIG. 3B, other delay periods may be used.

Figure 4:
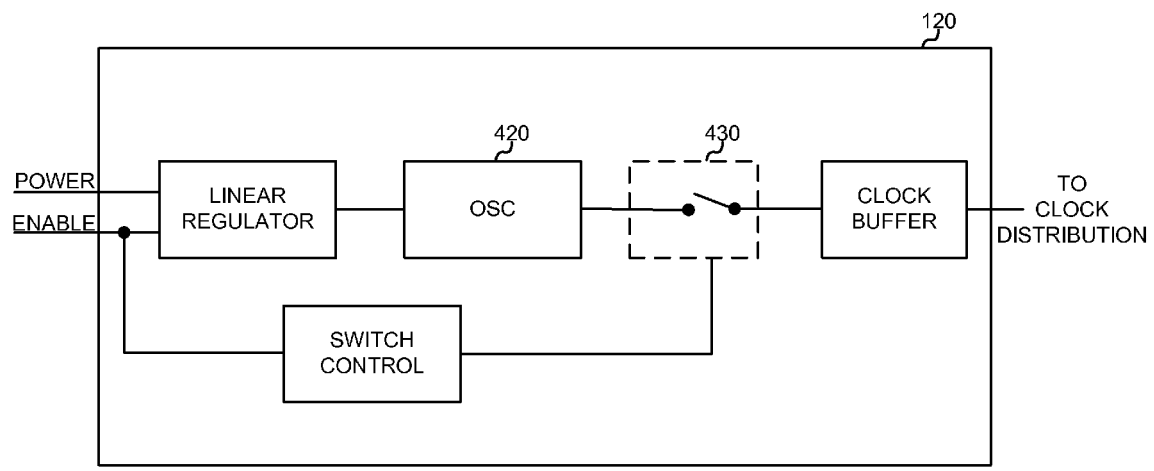
FIG. 4 is a diagram illustrating another example implementation of the clock circuit shown in FIG. 1.

FIG. 4 is a diagram illustrating another example of an implementation of clock circuit 120. The implementation of clock circuit 120, as shown in FIG. 4, is similar to the implementation of clock circuit 120, as shown in FIG. 2, except that an oscillator 420 outputs a single signal instead of a differential signal. Additionally, a switch 430 may implement a single pole switch instead of a double pole switch. The implementation of clock circuit 120, as shown in FIG. 4, may operate in a manner similar to the manner described above in connection with FIG. 2.

Figure 5:
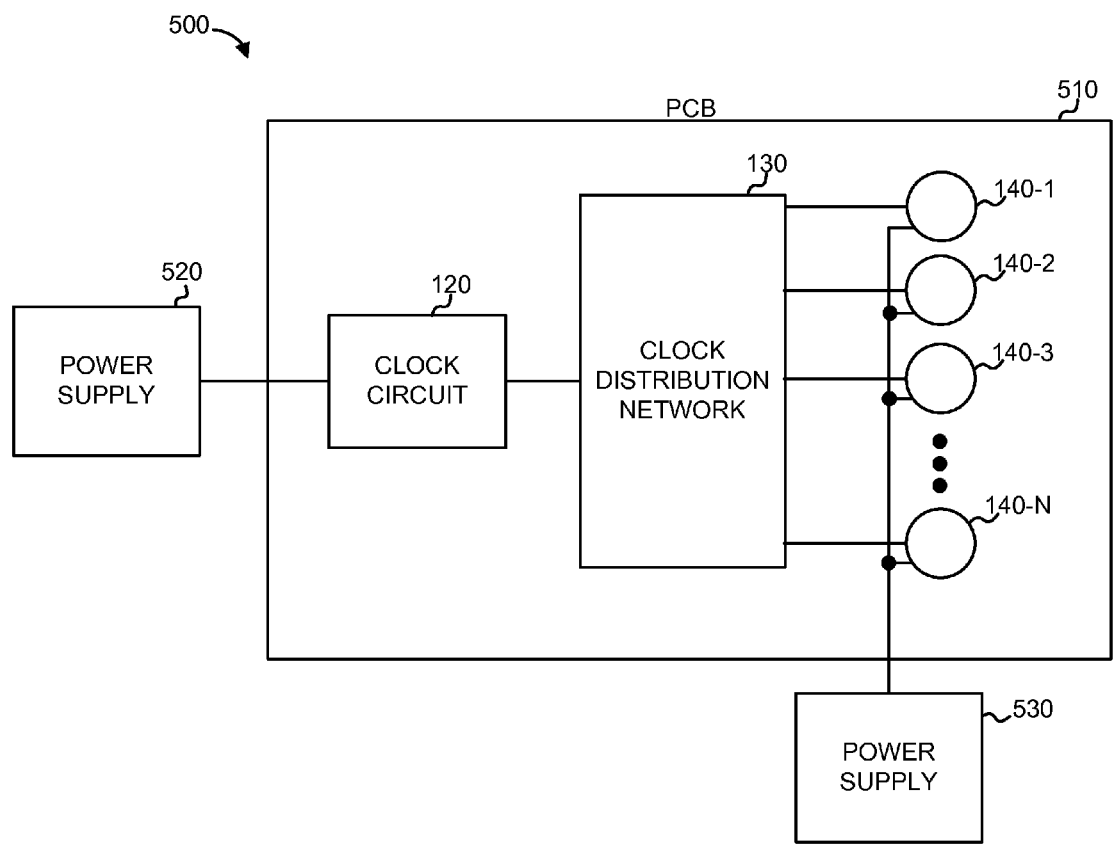
FIG. 5 is a diagram of another example system in which concepts described herein may be implemented.

FIG. 5 is a diagram of another example system 500 in which concepts described herein may be implemented. System 500 may include a printed circuit board (PCB) 510. PCB 510 may be similar to PCB 110, as shown in FIG. 1. In particular, PCB 510 may include clock circuit 120, clock distribution network 130, and functional components 140. These components may generally operate identically to the components as described with respect to FIG. 1. In particular, clock circuit 120 may include an isolation switch to isolate an oscillator from downstream components during startup of the oscillator.

In system 500, however, separate power supplies 520 and 530 may be used to supply power to clock circuit 120 and to functional components 140, respectively. The separation of the power supplies may include separation of both power and ground signals. By separating the power supplies for clock circuit 120 and the rest of system 500, noise that may otherwise be introduced from the power supply due to its connection to functional components 140, may be isolated from oscillator 220 of clock circuit 120. Advantageously, the system shown in FIG. 5 may provide for stable initiation of a high frequency oscillator in clock circuit 120 as the oscillator may be powered by a low-noise power supply and the oscillator may be isolated from its downstream components, both of which may reduce noise to the oscillator during startup of the oscillator.

Power supplies 520 and 530 may each include, for example, switching power supplies that receive alternating current (AC) and output direct current (DC) power. Alternatively, power supplies 520 and 530 may be implemented using, for example, a linear power supply or a battery-based power supply.

CONCLUSION

Aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an ASIC or a field programmable gate array (FPGA), or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:
1. A device comprising:
an oscillator to generate a periodic signal;
a clock buffer to receive the periodic signal and to convert the periodic signal into a periodic clock signal;
a switch positioned between the oscillator and the clock buffer, the switch including a control input that controls whether the switch is in an open state or a closed state, where the switch, when in the open state, prevents the oscillator from receiving noise from the clock buffer; and
a switch control circuit, an output of the switch control circuit being connected to the control input of the switch, to control the switch so that the switch is in the open state during startup of the oscillator and the switch is in the closed state thereafter.

2. The device of claim 1, further comprising:
a linear regulator connected to provide regulated power to the oscillator.

3. The device of claim 1, where the switch control circuit further includes:
a delay element to delay an enable signal and transmit a delayed version of the enable signal to the switch, where the enable signal controls startup of the oscillator.

4. The device of claim 3, where the delay element delays the enable signal for at least one millisecond.

5. The device of claim 1, where the periodic signal generated by the oscillator includes a differential signal.

6. The device of claim 1, where the periodic signal generated by the oscillator includes a single signal.

7. The device of claim 1, further comprising:
one or more functional components that use clock signals generated based on the periodic signal;
a first power supply to power the oscillator; and
a second power supply, separate from the first power supply, to power the one or more functional components.

8. The device of claim 7, further comprising:
a printed circuit board that contains the oscillator, the switch, the switch control circuit, and the one or more functional components, where the first and second power supply provide separate power and ground connections to the printed circuit board.

9. The device of claim 1, where the switch includes a mechanical relay.

10. The device of claim 1, where the switch uses field effect transistors (FETs).

11. The device of claim 1, where the switch operates to isolate the oscillator from high frequency noise generated by components that use the period signal during startup of the oscillator.

12. A device comprising:
a clock distribution circuit;
a plurality of functional components connected to receive one or more clock signals from the clock distribution circuit; and
a clock circuit including
an oscillator,
a clock buffer to receive an output from the oscillator and to convert the output signal into a periodic clock signal that is passed to the clock distribution circuit,
a switch connected to the oscillator and the clock buffer, where the switch is to pass to the oscillator or isolate from the oscillator, noise from at least one of the clock buffer or the clock distribution circuit, and
a switch control circuit to control the switch so that the switch isolates, from the oscillator, the noise during an initial startup of the oscillator.

13. The device of claim 12, where the clock circuit further includes:
a linear regulator connected to provide regulated power to the oscillator.

14. The device of claim 12, where the switch control circuit further includes:

a delay element to delay an enable signal before transmitting the enable signal to the switch.

15. A system comprising:

a printed circuit board including:

a clock distribution circuit;

a plurality of functional components connected to receive one or more clock signals from the clock distribution circuit; and a clock circuit including an oscillator, a clock buffer to receive an output from the oscillator and to convert the output signal into a periodic clock signal that is passed to the clock distribution circuit, a switch connected to the oscillator and the clock buffer, where the switch is to pass to or isolate from the oscillator, noise from at least one of the clock buffer or the clock distribution circuit, the switch being controlled so that the switch isolates the noise during an initial startup of the oscillator and passes the noise thereafter;

a first power supply connected to the printed circuit board to supply power to the plurality of functional components; and a second power supply connected to the printed circuit board to supply power to the clock circuit.

16. The system of claim 15, where the clock circuit further includes:

a linear regulator to provide regulated power to the oscillator.

17. The system of claim 15, where clock circuit further includes:

a delay element to delay a control signal the enables the oscillator to produce an output, the delay element outputting a delayed version of the control signal to the switch.

18. A method comprising generating, by an oscillator associated with a device, a periodic signal;

receiving, by a clock buffer associated with the device, the periodic signal, where the clock buffer converts the periodic signal into a periodic clock signal; and controlling, by the device, a switch positioned between the oscillator and the clock buffer, where the switch is in an open state or a closed state, and where the switch, when in the open state, prevents the oscillator from receiving noise from the clock buffer, where controlling the switch includes:

causing the switch to be in the open state during a startup of the oscillator, and causing the switch to be in the closed state after the startup of the oscillator.

19. The method of claim 18, further comprising:

providing, via a linear regulator included in the device, regulated power to the oscillator.

20. The method of claim 18, where the startup of the oscillator is in response to an enable signal, and where the method further comprises:

transmitting a delayed version of the enable signal to the switch to control the switch.

21. The method of claim 18, where the periodic signal generated by the oscillator includes a differential signal.

22. The method of claim 18, where the periodic signal generated by the oscillator includes a single signal.

* * * * *